United States Patent [19]

Amjad et al.

[11] Patent Number: 4,510,059
[45] Date of Patent: Apr. 9, 1985

[54] CARBOXYLIC FUNCTIONAL POLYAMPHOLYTES AS SILICA POLYMERIZATION RETARDANTS AND DISPERSANTS

[75] Inventors: Zahid Amjad, West Lake, Ohio; Monica A. Yorke, Coraopolis, Pa.

[73] Assignee: Calgon Corporation, Pittsburgh, Pa.

[21] Appl. No.: 582,403

[22] Filed: Feb. 22, 1984

Related U.S. Application Data

[63] Continuation of Ser. No. 411,182, Aug. 25, 1982, abandoned.

[51] Int. Cl.³ ............................................. C02F 5/12
[52] U.S. Cl. .................................... 210/701; 252/180
[58] Field of Search ............................ 210/698–701; 252/180, 181

[56] References Cited

U.S. PATENT DOCUMENTS

| | | | |
|---|---|---|---|
| 3,085,916 | 4/1963 | Zimmie et al. | 210/698 |
| 3,752,760 | 8/1973 | Gordon et al. | 210/701 |
| 3,752,761 | 8/1973 | Boothe et al. | 252/180 |
| 3,900,338 | 8/1975 | Rumpf et al. | 210/701 |
| 4,029,577 | 6/1977 | Godlewski et al. | 210/701 |
| 4,164,521 | 8/1979 | Goodman | 210/701 |
| 4,209,398 | 6/1980 | Ii et al. | 252/181 |
| 4,328,106 | 5/1982 | Harrar et al. | 210/700 |
| 4,357,207 | 11/1982 | Yorke | 210/698 |
| 4,460,477 | 7/1984 | Costello et al. | 210/701 |

FOREIGN PATENT DOCUMENTS 2026517  2/1980  United Kingdom ............... 252/180

OTHER PUBLICATIONS

Harrar et al., "Studies of Scale Formation and Scale Inhibitors at the Salton Geothermal Field, *Corrosion*/80 Paper No. 225, Mar. 3–7, 1980.
Harrar et al., "Final Report on Tests of Proprietary Chemical Additives as Anti-Scalants for Hypersaline Geothermal Brine, Lawr. Livermore Labs., Jan. 1980.
Harrar et al., "On-Line Tests of Organic Additives for the Inhibition of the Precipitation of Silica from Hypersaline Geothermal Brine IV, Feb. 1980, Lawr. Livermore Labs.

*Primary Examiner*—Peter Hruskoci
*Attorney, Agent, or Firm*—Michael C. Sudol; R. Brent Olson; William C. Mitchell

[57] ABSTRACT

The instant invention is directed to a method for reducing the formation of silica deposits in an aqueous system comprising adding an effective amount, preferably at least 0.1 ppm, of a carboxylic functional polyampholyte or the salt thereof to said aqueous system.

2 Claims, No Drawings

CARBOXYLIC FUNCTIONAL POLYAMPHOLYTES AS SILICA POLYMERIZATION RETARDANTS AND DISPERSANTS

This is a continuation of application Ser. No. 411,182, filed Aug. 25, 1982 now abandoned.

BACKGROUND OF THE INVENTION

Silica deposition in aqueous systems, for example cooling towers and hypersaline geothermal brines, has been a continual problem. They have, historically, been cleaned by blow-down. If deposition occurs, mechanical removal has been the method used. Obviously, this causes loss of time and increased energy and labor costs.

pH affects the ionization of silanol groups and, therefore, affects the polymerization rate. Silica first forms, then three dimensional networks and, eventually, colloidal particles grow through condensation. At pH 7, nuclei formation and particle growth is very rapid. The pH of cooling water is generally 6.0 to 8.5 and the water temperature is generally about 30° to 70° C. The pH of geothermal brines is generally 4.0 to 6.0 and the brine temperature is generally about 100° to 210° C.

It is known to use cationic polymers or cationic surfactants as silica scale inhibitors in hypersaline geothermal brines (Harrar, J. E. et al, "Final Report on Tests of Proprietary Chemical Additives as Anti-scalants for Hypersaline Geothermal Brine", January 1980, Lawrence Livermore Laboratory; Harrar, J. E. et al, "On-Line Tests of Organic Additives for the Inhibition of the Precipitation of Silica from Hypersaline Geothermal Brine IV. Final tests of Candidate Additives", February 1980, Lawrence Livermore Laboratories; and Harrar, J. E. et al, "Studies of Scale Formation and Scale Inhibitors at the Salton Sea Geothermal Field", Corrosion/80, Paper No. 225, International Corrosion Forum Devoted Exclusively to the Protection and Performance of Materials, Mar. 3–7, 1980, Chicago, Ill.).

DESCRIPTION OF THE INVENTION

The instant invention is directed to a method for reducing the formation of silica deposits in an aqueous system comprising adding an effective amount, preferably at least 0.1 ppm, of a carboxylic functional polyampholyte or the salt thereof to said aqueous system.

Any carboxylic functional polyampholyte, or the salt thereof, may be used. A polyampholyte is a polymer containing anionic, cationic and optionally nonionic mer units. The anionic mer unit contains the carboxyl group.

Although any carboxylic functional polyampholyte may be used, it is preferably prepared from:

(i) at least one carboxylic functional monomer of the formula:

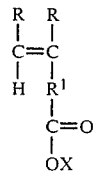

wherein

R, which may be the same or different, is hydrogen, a phenyl, an alkyl group of from 1 to 3 carbon atoms, preferably hydrogen, methyl or ethyl, or a —COOX group, $R^1$ is a straight or branched chain of from 0 to 12 carbon atoms, preferably 0 to 3, and X is hydrogen or an alkali or alkaline earth metal, preferably hydrogen, sodium, potassium or cesium;

(ii) at least one cationic-containing monomer; and (iii) optionally, non-ionic monomer.

Any carboxylic functional monomer, or its salt, may be used. Examples include acrylic acid, methacrylic acid, vinyl acetic acid, allylacetic acid, 4-methyl-4-pentenoic acid and dicarboxylic acids, such as maleic acid and itaconic acid. The preferred carboxylic functional monomers are acrylic acid and methacrylic acid. Mixtures of carboxylic functional monomers may be used in preparing the polyampholyte.

Any cationic-containing monomer may be used. The preferred cationic-containing monomers are:

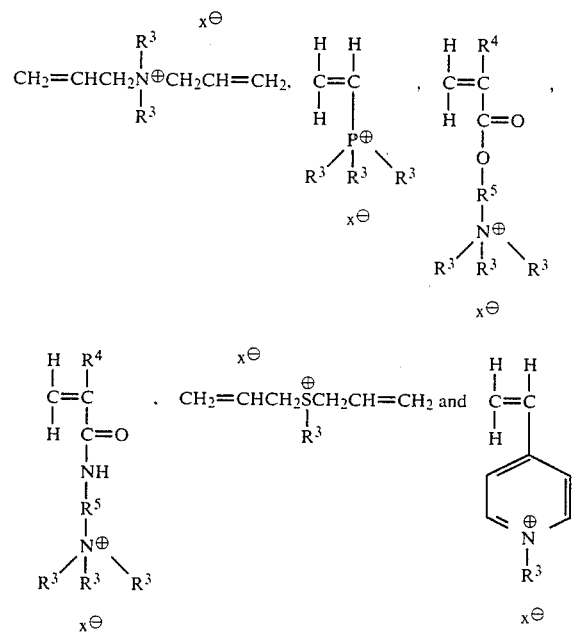

wherein $R^3$ is hydrogen, a phenyl, or an alkyl group of from 1 to 3 carbon atoms;

$R^4$ is a hydrogen or an alkyl group of from 1 to 3 carbon atoms, preferably a hydrogen or methyl group, $R^5$ is a straight or branched chain of from 1 to 12 carbon atoms, preferably 1 to 3 carbon atoms; and X is an anion, preferably a halogen or alkyl sulfate.

X may be any anion in the above formula. Examples include halogen, sulfate, sulfonate, phosphate, hydroxide, borate, cyanide, carbonate, thiocyanate, thiosulfate, isocyanate, sulfite, bisulfite, nitrate, nitrite, oxalate, silicate, sulfide, cyanate, acetate and the other common inorganic and organic ions.

Specific examples of the most preferred cationic-containing monomers include diethyldiallyl ammonium chloride, dimethyldiallyl ammonium chloride, methacryloyloxy ethyl trimethyl ammonium methylsulfate and methacrylamido propyl trimethyl ammonium chloride. Mixtures of cationic-containing monomers may be used in preparing the polyampholyte.

The polyampholyte may also be prepared by polymerizing a monomer containing a tertiary amine as the pendant group with subsequent quaternization of the nitrogen in the polymer to form the cationic mer units. Likewise, sulfur and phosphorus-containing monomers may be exhaustively methylated to form cations.

One or more non-ionic monomers may optionally be used. Examples include: acrylamide, and its derivatives, such as methacrylamide, and N,N-dimethyl acrylamide; acrylonitrile; vinyl acetate; vinyl pyridine; hydroxyalkyl acrylates; methacrylate, and its derivatives; butadiene; styrene, and its derivatives, including substituted styrenes; hydroxyesters of olefinic carboxylic acids; alkylene oxides; divinyl ketones; vinyl ketones; divinyl ethers and alkyl vinyl ethers. The preferred non-ionic monomer is acrylamide. Mixtures of non-ionic monomers may be used in preparing the polyampholyte.

The most preferred carboxylic functional polyampholytes are polymers prepared from:

(i) a carboxylic functional monomer of the formula:

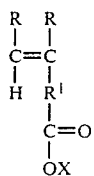

wherein

R, which may be the same or different, is hydrogen, a phenyl or an alkyl group of from 1 to 3 carbon atoms, preferably hydrogen, methyl or ethyl, $R^1$ is a straight or branched chain of from 0 to 12 carbon atoms, preferably 0 to 3, and X is hydrogen or an alkali or alkaline earth metal, preferably hydrogen, sodium, potassium or cesium;

(ii) a monomer of the formula:

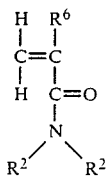

wherein $R^6$ is hydrogen, a phenyl or an alkyl group of from 1 to 3 carbon atoms, preferably a hydrogen, methyl, or ethyl, and $R^2$, which may be the same or different, is a hydrogen, or an alkyl group of from 1 to 3 carbon atoms; and (iii) a cationic-containing monomer containing an ion selected from the group consisting of a quaternary ammonium, phosphonium or sulfonium.

The polymer may be produced from any ratio of the monomers. It is preferred that the polymer be prepared from 5 to 90%, most preferably 5 to 40%, by weight, carboxylic functional monomer; 0.5 to 90%, most preferably 10 to 90%, by weight, cationic monomer; and 0 to 85%, more preferably 1.5 to 85%, and most preferably 5 to 67.5%, by weight, non-ionic monomer. A higher percent of non-ionic monomer may be used, and subsequently hydrolyzed to a sufficient extent that the final percent is in the preferred range. Likewise, a copolymer may be prepared from non-ionic monomer and cationic monomer with subsequent hydrolysis of the non-ionic monomer to form the anionic portion, e.g. acrylamide can be hydrolyzed to form acrylic acid.

The term "aqueous", as used herein, is intended to include water in any physical state and to include water in which is dissolved or dispersed any substance, for example, inorganic salts in brine or seawater.

The treatment concentration of the polyampholyte employed in the present invention to inhibit the polymerization and formation of silica deposits is generally at least 0.1 ppm, preferably 0.1 to 500 ppm by weight of the total solution of the water-carrying system being treated. Most preferably, the concentration level range will be from about 1.0 to 200 ppm.

The polyampholyte polymers may be prepared by mixing the monomers preferably in the presence of a free radical initiator. Any free radical initiator may be used. Examples include peroxides, azo initiators and redox systems. The preferred catalysts are sodium persulfate or a mixture of ammonium persulfate and any azo type initiator, such as 2,2'-azobis-(2,4-dimethyl-4-methoxyvaleronitrile). The polymerization may also be initiated photochemically.

The polyampholyte may be made by any of a variety of procedures, for example, in solution, suspension, bulk and emulsions.

The temperature is not critical. The reaction will generally occur between 10° and 100° C., preferably 40° to 60° C. It is generally impractical to run the reaction below room temperature because the reaction is too slow. Above a temperature of 60° C., the molecular weight of the polymer tends to decrease. The reaction, depending on the temperature, generally takes from 1 to 12 hours. Measuring for residual monomer will verify when the reaction is complete.

The pH of the reaction mixture is not critical. The pH is generally in the range of 4.5 to 9.0.

The molecular weight of ampholytic polymers is difficult to accurately measure. The polymers are instead, usually identified by intrinsic viscosity. The intrinsic viscosity of the polyampholyte is not critical in the instant invention. It is preferred that the intrinsic viscosity be at least 0.05 dl/g. in 1.0M sodium chloride (measured on a 75 Cannon Ubbelohde capillary viscometer).

EXAMPLES

The polymers of the Examples were produced by mixing the cationic, anionic and optionally nonionic monomers in the amounts indicated in Table I, at 30% solids concentration, initial temperature of 50° C., and pH of 4.5. The monomer mix was purged with nitrogen for one hour. The solvent was deionized water. Initiator in an amount 0.003 moles sodium persulfate/mole monomer mix was added and the components allowed to react for about three hours.

EXAMPLES 1 THROUGH 3

20.0 mls of 1.0M sodium chloride, 8 mls of 0.1M sodium silicate solution, and a predetermined amount of inhibitor, if any, were mixed and diluted with distilled water to give 100 mls final volume. The temperature of the mixture was held at about 40° C. throughout the experiment and the pH was adjusted to 8.0 by the addition of hydrochloric acid. The silica monomer concentration was determined after 5.0 minutes by the molybdate method [Alexander, G. B.; J.A.C.S. 75, 5055 (1953)] and at subsequent time intervals. The data was analyzed by use of a second order kinetic plot and the polymerization rate was determined. Table I records the effects of inhibitor on the silica polymerization process. A reduction in this polymerization rate is indicative of an expected reduction in the rate of silica deposition onto heat transfer and water transport surfaces in aqueous systems.

TABLE I

| Example | Polymer (Wt %) | Intrinsic Viscosity[$\eta$] in 1.0 M NaCl | Dosage (ppm) | $SiO_2$ Polymerization Rate ($M^{-1}Minute^{-1}$) |
|---|---|---|---|---|
| 1 | None | — | — | 1.7 |
| 2 | 32.5% AA[1]/17.5% DMDAAC[2]/50% AM[3] | 1.0 | 100 | 0.6 |
| 3 | 30.0% AA/2.5% DEDAAC[4]/27.5% DMDAAC/40% AM | 11.4 | 50 | 0.12 |

[1] AA = acrylic acid
[2] DMDAAC = dimethyldiallyl ammonium chloride
[3] AM = acrylamide
[4] DEDAAC = diethyldiallyl ammonium chloride

What is claimed is:

1. A method for reducing the formation of silica deposits in an aqueous system comprising adding to said aqueous system an effective amount of a carboxylic functional polyampholyte or the salt thereof, having an intrinsic viscosity of at least 1.0 dl/g. in 1.0M sodium chloride, prepared from 30 to 32.5 percent, by weight, of acrylic acid; 17.5 to 30 percent, by weight, of a cationic-containing monomer selected from the group consisting of dimethyldiallyl ammonium chloride, diethyldiallyl ammonium chloride and mixtures thereof; and 40 to 50 percent, by weight, acrylamide to retard polymerization of silica and reduce the formation of silica deposits in said aqueous system.

2. The method of claim 1, wherein at least 0.1 ppm of carboxylic functional polyampholyte or the salt thereof is used.

* * * * *